United States Patent Office 3,337,428
Patented Aug. 22, 1967

3,337,428
PROCESS OF FORMING A CAPACITOR
Allen J. Wright, 91 Hall St., Concord, N.H. 03301
Filed Nov. 19, 1963, Ser. No. 324,627
6 Claims. (Cl. 204—38)

The present invention relates to so-called solid electrolyte capacitors, and more particularly to a process for producing pellet-type solid electrolyte capacitors.

Capacitors of this type comprise a porous sintered anode, the surfaces of which have a dielectric oxide thereon, a solid electrolyte of semiconducting material in intimate contact with the dielectric, and a cathode or counterelectrode in intimate contact with the solid electrolyte. The production of this unit and its assembly within a suitable casing to form the completed capacitor, involves the observation of certain limits both as to size and electrical characteristics.

The solid electrolyte is produced in intimate contact with the oxide layer of the sintered pellet by impregnation of this anode body with a solution of a semiconducting oxide precursor, followed by pyrolysis of the precursor to form the semiconducting oxide. This impregnation-pyrolysis sequence is repeated a number of times to insure a continuous solid electrolyte layer. The pyrolysis-deposition of the semiconducting oxide on the pellet results in an outer layer of considerable irregularity and roughness. This layer, which is characterized by asperities, burrs and peaks, varies in overall dimensions from unit to unit. This nonuniformity from unit to unit creates a problem in fitting the units within standard casings. Heretofore, it has been necessary to physically abrade or otherwise mechanically size the units in order to give them a uniform surface of the proper dimensions.

It is, therefore, an object of the instant invention to present a process overcoming the foregoing problem.

Another object is to provide a process for the production of solid electrolyte capacitors wherein the solid electrolyte layer is reasonably smooth and substantially uniform from unit to unit.

Figure 1:
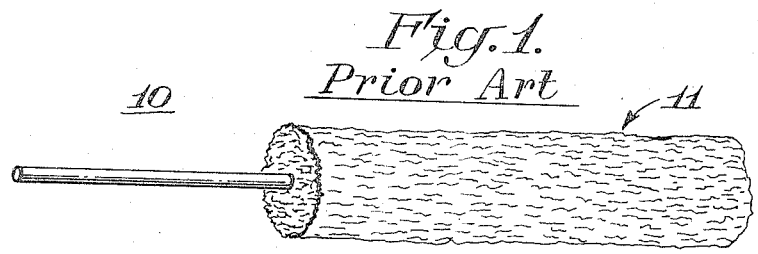
Figure 2:
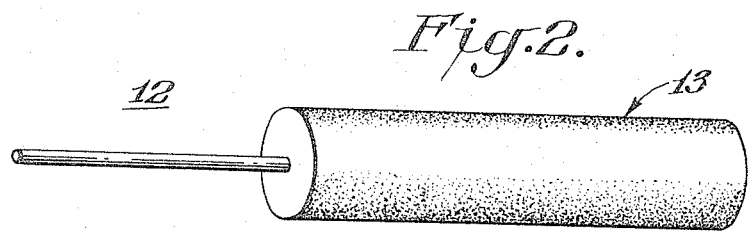

Other objects and advantages of the present invention will be made obvious to those skilled in the art by the following description when considered in relation to the accompanying drawing, of which:

FIGURE 1 is a perspective view of a prior art anode having an irregular solid electrolyte layer; and, FIGURE 2 is a side view of the comparatively smooth-surfaced unit of the present invention.

In general the objects of this invention are achieved by a process comprising impregnating a porous sintered valve metal anode with a semiconducting oxide precursor, subjecting the impregnated anode to a reduction in temperature at least sufficient to crystallize the precursor prior to pyrolysis of said precursor, and then subjecting the precursor to pyrolysis.

By semiconducting oxide precursor, as used herein, is meant any material which is decomposable to the semiconducting oxide. For example, manganous nitrate is decomposable to manganese dioxide or a mixture of manganese oxides having a substantial proportion of the dioxide. Examples of other manganese dioxide precursors are manganous oxalate, -formate, -acetate, etc. Lead oxide, another semiconducting oxide, can be formed by decomposing appropriate precursors.

The anodes contemplated may be any of the valve-metals, tantalum, aluminum, etc., in the form of a porous, sintered pellet. The invention will be exemplified by the following process using tantalum as the anode and manganous nitrate as the precursor.

In carrying out the process of this invention a porous electrode is produced by compressing and sintering tantalum particles. A short length of tantalum wire is affixed to this body. Thereafter, the porous electrode is suspended in a liquid electrolyte which permeates the body. The electrode is made the anode for forming a tantalum oxide layer over the entire surface of the body, including the internal surfaces of the interstices thereof. The formed electrode is then impregnated with a solution of a manganese oxide precursor. The impregnated formed electrode is then decreased in temperature to between 15° C. and —80° C. Thereafter, before there is any appreciable increase in temperature, and preferably immediately, the precursor is subjected to pyrolysis to convert it to manganese dioxide. This is accomplished by firing the unit at a temperature and for a time sufficient to drive off all visible signs of $NO_2$. This involves firing at a temperature from about the decomposition temperature of the precursor to about 450° C. Following pyrolysis, the tantalum oxide layer on the tantalum pellet is electrolytically reformed. This reformation materially decreases the leakage current of the unit. To complete the unit a cathode electrode is applied thereto.

Although an operable unit results from the foregoing process wherein only single cooling and pyrolysis steps are employed, it has been determined that optimum conditions involve repeating the impregnation and pyrolysis steps a number of times. This repetition will insure a substantially complete coating of manganese dioxide on the tantalum oxide dielectric surface.

The cooling step must be performed after at least one impregnation step and may be performed after each impregnation step. It is preferred that there be from 1 to 3 cooling steps in a six to ten cycle process. The reformation step need not be performed after every pyrolysis step. The leakage current of the unit can be kept within proper limits by reforming about two or three times during a six to ten cycle process. The following is an example of a multi-cycle process.

A tantalum oxide-formed tantalum pellet is impregnated with a 50% manganous nitrate-water solution. The impregnated body is then fired until the brown $NO_2$ fumes are no longer visible. This procedure is repeated six more times and after the second and fifth impregnation, the impregnated body is cooled to about —20° C. just prior to pyrolysis. After the third and after the final pyrolysis steps a reformation step in aqueous phosphoric acid is performed.

After the pellet has been impregnated, cooled, pyrolyzed and reformed for the last time, the capacitor is completed by the application of a cathode electrode and the assembly of this section into a suitable housing, both according to conventional practice. For example, a colloidal graphite layer is applied to the manganese oxide strata and over this applied a negative electrode. This electrode may be any of the prior art counterelectrodes, e.g. silver, applied as a metal paint. Sections produced according to the process of this invention can be easilly placed within standard casings or housings.

The drawing graphically illustrates the character of the external surface of the completed pellets. FIGURE 1 illustrates a prior art tantalum pellet 10 having a surface 11 characterized by burrs and peaks. In contrast thereto FIGURE 2 illustrates a unit 12 formed by the process of the present invention. The surface 13 thereof is comparatively smooth.

The formation electrolyte may be any of the prior art electrolytes which will effectively yield a tantalum oxide surface, e.g. ammonium chloride, ammonium nitrate, ammonium acetate, ammonium formate, fused sodium nitrate-sodium nitrite, phosphoric acid, etc.

As is evident from the foregoing, the invention is not to be limited to the rather specific illustrative process. Modifications and variations, as well as the substitution of equivalents may be made without departing from the spirit of the invention as defined in the appended claims.

What is claimed is:

1. A process for producing a capacitor comprising:
   (a) impregnating an anodized, porous, valve-metal body with a solution of a semiconducting oxide precursor;
   (b) subjecting the impregnated body to a reduction in temperature at least sufficient to crystallize said precursor;
   (c) pyrolysing said precursor to form the semiconducting oxide;
   (d) electrolytically reforming the oxide film of the valve-metal body; and
   (e) applying an electrically conductive connection to the semiconducting oxide.

2. A process for producing a capacitor comprising:
   (a) impregnating an anodized, porous, valve-metal body with a solution of a semiconducting oxide precursor;
   (b) pyrolysing said precursor to form the semiconducting oxide;
   (c) repeating steps (a) and (b) a number of times in order to insure substantially complete coverage of the valve-metal oxide with the semiconducting oxide;
   (d) after at least one of the pyrolysis steps, electrolytically reforming the valve-metal oxide coating;
   (e) after at least one of the impregnation steps, subjecting the impregnated body to a reduction temperature at least sufficient to crystallize said precursor; and
   (f) applying an electrically conductive connection to the semiconducting oxide.

3. A process for producing a tantalum capacitor comprising:
   (a) impregnating a porous tantalum body, in which the tantalum surfaces have an in situ formed coating of tantalum oxide with a solution of a manganese oxide precursor;
   (b) subjecting the impregnated body to a reduction in temperature at least sufficient to crystallize said precursor;
   (c) pyrolysing said precursor to form manganese dioxide;
   (d) electrolytically reforming the oxide film of the tantalum body; and
   (e) applying an electrically conducting connection to the manganese dioxide.

4. A process for producing a tantalum capacitor comprising:
   (a) impregnating a porous tantalum body, in which the tantalum surfaces have an in situ formed coating of tantalum oxide with a solution of a manganese oxide precursor;
   (b) pyrolysing said precursor to form manganese dioxide;
   (c) repeating steps (a) and (b) a number of times in order to insure substantially complete coverage of the tantalum oxide with manganese dioxide;
   (d) after at least one of the pyrloysis steps, electrolytically reforming the tantalum oxide coating;
   (e) after at least one of the impregnation steps, subjecting the impregnated body to a reduction temperature at least sufficient to crystallize said precursor; and
   (f) applying an electrically conductive connection to the manganese dioxide.

5. A process for producing a tantalum capacitor comprising:
   (a) impregnating a porous tantalum body, in which the tantalum surfaces have an in situ formed coating of tantalum oxide with a solution of a manganese oxide precursor;
   (b) pyrolysing said precursor to form manganese dioxide;
   (c) repeating steps (a) and (b) a number of times in order to insure substantially complete coverage of the tantalum oxide with manganese dioxide;
   (d) after at least one of the pyrolysis steps, electrolytically reforming the tantalum oxide coating;
   (e) after at least one of the impregnation steps, subjecting the impregnated body to a reduction temperature sufficient to bring the impregnated solution to within the range of $-80°$ C. to $15°$ C.
   (f) applying an electrically conductive connection to the manganese dioxide.

6. The process of claim 5 wherein the manganese oxide precursor is manganous nitrate and the reduction in temperature is about $-20°$ C.

References Cited

UNITED STATES PATENTS

| | | | |
|---|---|---|---|
| 2,936,514 | 5/1960 | Millard | 29—25.31 |
| 2,965,816 | 12/1960 | Ross | 317—230 |
| 3,231,436 | 1/1966 | Shiraishi et al. | 148—171 |

JOHN H. MACK, *Primary Examiner.*

HOWARD S. WILLIAMS, *Examiner.*

W. VAN SISE, *Assistant Examiner.*

UNITED STATES PATENT OFFICE
CERTIFICATE OF CORRECTION

Patent No. 3,337,428                            August 22, 1967

Allen J. Wright

It is hereby certified that error appears in the above numbered patent requiring correction and that the said Letters Patent should read as corrected below.

In the heading to the printed specification, line 3, for "Allen J. Wright, 91 Hall St., Concord, N. H. 03301" read -- Allen J. Wright, Concord, N. H., assignor to Sprague Electric Company, North Adams, Mass., a corporation of Massachusetts --; column 3, line 52, for "conducting" read -- conductive --; column 4, line 12, for "pyrloysis" read -- pyrolysis --; line 33, for "impregnation" read -- impregnating --; line 34, for "reduction" read -- reduction in --; line 42, for "is" read -- is to --.

Signed and sealed this 29th day of October 1968.

(SEAL)
Attest:

Edward M. Fletcher, Jr.                               EDWARD J. BRENNER
Attesting Officer                                          Commissioner of Patents